(12) United States Patent
Sheppard et al.

(10) Patent No.: US 11,934,399 B2
(45) Date of Patent: Mar. 19, 2024

(54) METHOD AND SYSTEM FOR ESTIMATING THE CARDINALITY OF INFORMATION

(71) Applicant: The Nielsen Company (US), LLC, New York, NY (US)

(72) Inventors: Michael Sheppard, Holland, MI (US); Edward Murphy, Montville, CT (US); Jonathan Sullivan, Hurricane, UT (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/460,679

(22) Filed: Aug. 30, 2021

(65) Prior Publication Data
US 2023/0063709 A1 Mar. 2, 2023

(51) Int. Cl.
| | | |
|---|---|---|
| G06F 16/23 | (2019.01) | |
| G06F 16/22 | (2019.01) | |
| G06F 16/2453 | (2019.01) | |
| G06F 16/2455 | (2019.01) | |
| G06F 16/2458 | (2019.01) | |
| G06F 16/951 | (2019.01) | |
| G06Q 30/0242 | (2023.01) | |

(52) U.S. Cl.
CPC .... *G06F 16/24545* (2019.01); *G06F 16/2255* (2019.01); *G06F 16/2264* (2019.01); *G06F 16/2462* (2019.01); *G06F 16/951* (2019.01); *G06Q 30/0246* (2013.01)

(58) Field of Classification Search
CPC ........... G06F 16/24545; G06F 16/2255; G06F 16/2264; G06F 16/2462; G06F 16/951; G06Q 30/0246
See application file for complete search history.

(56) References Cited

U.S. PATENT DOCUMENTS

| | | | |
|---|---|---|---|
| 2009/0043649 A1* | 2/2009 | Wright | G06Q 30/02 |
| | | | 705/14.69 |
| 2010/0070514 A1* | 3/2010 | Woodruff | G06F 16/9535 |
| | | | 707/754 |

(Continued)

OTHER PUBLICATIONS

Johnson, Norman L., and Samuel Kotz. Urn models and their application: an approach to modern discrete probability theory. New York: Wiley, 1977, 96 pages.

(Continued)

*Primary Examiner* — Etienne P Leroux
*Assistant Examiner* — Oscar Wehovz
(74) *Attorney, Agent, or Firm* — McDonnell Boehnen Hulbert & Berghoff LLP

(57) ABSTRACT

A computer-implemented method for efficiently estimating the number of unique elements in a collection of elements comprises generating, via hash logic, hash values associated with the elements. The hash values specify bit positions within an array of bits. Hash values output from the hash logic conform to a geometric distribution such that bit positions of the array of bits corresponding to lower orders bits are more likely to be generated than bit positions corresponding to higher-order bits. Bits of the array of bits corresponding to the bit positions are set. The number of bits of the array of bits that are set is counted. Estimation logic estimates the number of unique elements of the collection of elements as a function of the number of bits of the array of bits that are set.

17 Claims, 5 Drawing Sheets

(56) References Cited

U.S. PATENT DOCUMENTS

| | | | |
|---|---|---|---|
| 2014/0041047 A1* | 2/2014 | Jaye | G06F 21/6245 |
| | | | 726/27 |
| 2017/0039222 A1* | 2/2017 | Farrow | G06F 16/29 |
| 2017/0193382 A1* | 7/2017 | Villa | G06N 7/01 |
| 2018/0137155 A1* | 5/2018 | Majumdar | G06N 10/00 |
| 2021/0359846 A1* | 11/2021 | Wright | G06N 7/01 |
| 2022/0376887 A1* | 11/2022 | Wright | H04L 9/008 |

OTHER PUBLICATIONS

Swamidass et al., "Mathematical correction for fingerprint similarity measures to improve chemical retrieval." Journal of Chemical Information and Modeling, 47.3, 2007, 952-964.

Unknown Author, "LinearLegions: A Linear Size Cardinality Estimator", Technical Disclosure Commons, Nov. 29, 2020, 20 pages. (https://www.tdcommons.org/dpubs_series/3830).

Closed-form or approximation to infinite sum $S(p,m)=\Sigma\infty k=1(1-(1-(1-p)k-1p)m)$, URL (version: Feb. 4, 2020), 3 pages. (https://math.stackexchange.com/q/3533567).

Unknown Author, "The AKP Cardinality Formula", Technical Disclosure Commons, 2021, 7 pages.

\* cited by examiner

METHOD AND SYSTEM FOR ESTIMATING THE CARDINALITY OF INFORMATION

BACKGROUND

Field

This application generally relates to information processing systems. In particular, this application describes a method and system for estimating the cardinality of information.

Description of Related Art

Determining the number of individuals that view particular content is of interest in many applications. For instance, a web page operator may want to know the number of individuals that visit a particular web page. The web page operator may use the information for various purposes such as determining hardware requirements of the web page (e.g., processing power, memory, etc.) This information may also facilitate determining a price to charge for hosting advertisement content.

In some instances, the number of different individuals (i.e., as opposed to the total number of visits) may be of further interest to particular advertisers. When the number of visits per day is relatively small, the web page serving system can maintain a list of different individuals that visit the site. When a particular individual visits the web page for the first time, information that identifies the individual (e.g., a cookie) can be added to the list. The number of elements in the list corresponds to the number of different individuals that visited the web page.

However, such a technique is not practical for web pages that receive millions of visits a day.

SUMMARY

In a first aspect, a computer-implemented method for efficiently estimating the number of unique elements in a collection of elements comprises generating, via hash logic, hash values associated with the elements. The hash values specify bit positions within an array of bits. Hash values output from the hash logic conform to a geometric distribution such that bit positions of the array of bits corresponding to lower orders bits are more likely to be generated than bit positions corresponding to higher-order bits. Bits of the array of bits corresponding to the bit positions are set. The number of bits of the array of bits that are set is counted. Estimation logic estimates the number of unique elements of the collection of elements as a function of the number of bits of the array of bits that are set.

In a second aspect, a computing system includes a memory and a processor. The memory stores instruction code. The processor is in communication with the memory. The instruction code is executable by the processor to cause the computing system to perform operations that include generating, via hash logic, hash values associated with the elements. The hash values specify bit positions within an array of bits. Hash values output from the hash logic conform to a geometric distribution such that bit positions of the array of bits corresponding to lower orders bits are more likely to be generated than bit positions corresponding to higher-order bits. Bits of the array of bits corresponding to the bit positions are set. The number of bits of the array of bits that are set is counted. Estimation logic estimates the number of unique elements of the collection of elements as a function of the number of bits of the array of bits that are set.

In a third aspect, a non-transitory computer-readable medium having stored thereon instruction code is provided. When the instruction code is executed by a processor, the processor performs operations that include generating, via hash logic, hash values associated with the elements. The hash values specify bit positions within an array of bits. Hash values output from the hash logic conform to a geometric distribution such that bit positions of the array of bits corresponding to lower orders bits are more likely to be generated than bit positions corresponding to higher-order bits. Bits of the array of bits corresponding to the bit positions are set. The number of bits of the array of bits that are set is counted. Estimation logic estimates the number of unique elements of the collection of elements as a function of the number of bits of the array of bits that are set.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1:
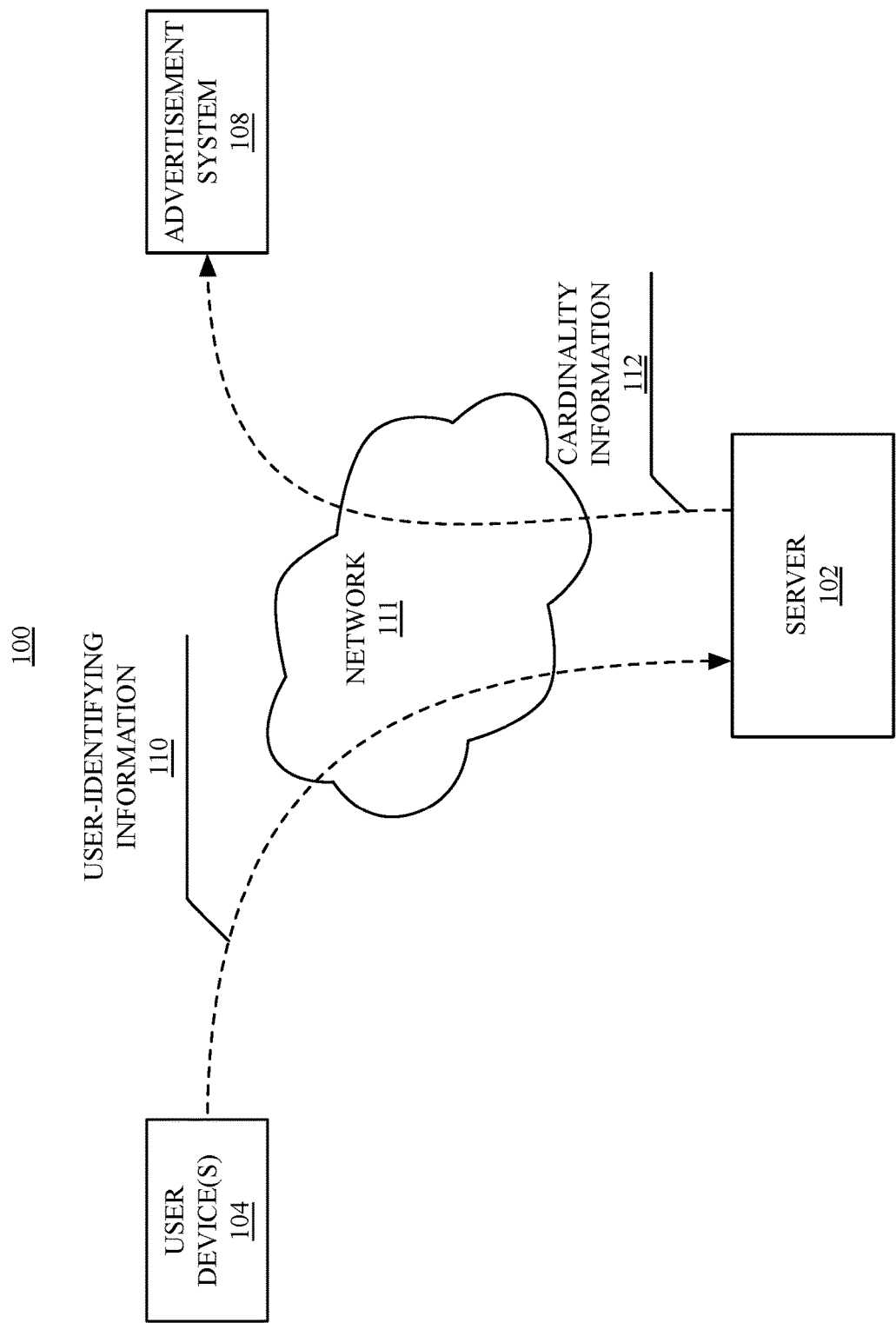
FIG. 1 illustrates an environment that includes various systems/devices that facilitate estimating the cardinality of information, in accordance with example embodiments.

Implementations of this disclosure provide technological improvements that are particular to computer technology, such as those related to reducing hardware resources and power consumption. In this regard, a computing system disclosed herein is configured to efficiently process a large collection of elements to determine the cardinality or number of unique elements in the collection in a computationally efficient manner. For example, methods performed by the computing system significantly reduce the amount of memory and power consumption required by the computing system to process the collection of elements by estimating the cardinality.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

As noted above, for web pages receiving a relatively small number of daily visits, a list of the identifies the different individuals may be maintained. For instance, when a particular individual visits the web page for the first time, information that identifies the individual (e.g., a cookie) can be added to the list. The number of elements in the list corresponds to the number of different individuals that visited the web page. This technique is not, however, practical for web pages that receive millions of visits a day because the size of the list would need to be much larger (i.e., the system would require additional memory), and searching such a list to determine whether a particular individual is already represented in the list could be processor intensive.

However, in many cases, an estimate of the number of different individuals, rather than the exact number, may be suitable. As described in more detail below, the memory requirements and processing power associated with determining an estimate of the number of different individuals is orders of magnitude smaller than the memory requirements and processing power that would otherwise be required to maintain and process the list described above.

FIG. 1 illustrates an example of an environment 100 that includes various systems/devices that facilitate estimating the cardinality of information. Example systems/devices of the environment 100 include user device(s) 104, a server 102, and an advertisement system 108. As described in further detail below, the user device(s) 104 are configured to communicate user-identifying information 110 to the server 102. The user-identifying information 110 associated with a particular user is sometimes referred to herein as an element, and user-identifying information 110 associated with several user devices(s) or users is referred to herein as a collection of elements.

In response to receiving this information, the server 102 is configured to determine cardinality information 112 associated with the user-identifying information 110 and, in some examples, communicate the cardinality information 112 to the advertisement system 108. In an example, the user device(s) 104, server 102, and advertisement system 108 communicate information to one another via a communication network 111, such as the Internet, a cellular communication network, a WiFi network, etc.

Figure 2:
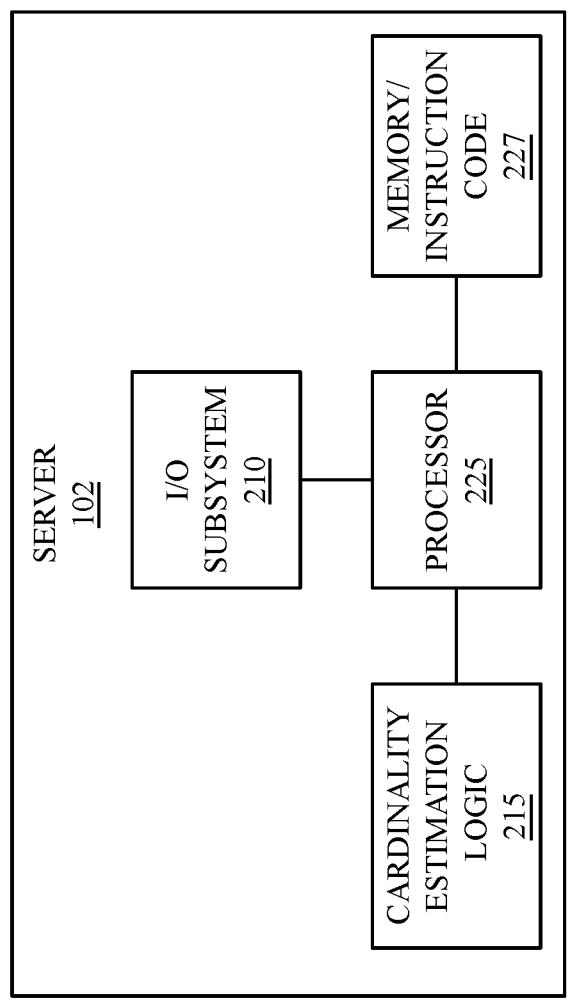
FIG. 2 illustrates a server, in accordance with example embodiments.

FIG. 2 illustrates an example of a server 102. An example of the server 102 includes a memory 227 and a processor 225. An example of server 102 also includes an input/output (I/O) subsystem 210, and cardinality estimation logic 215.

An example of the processor 225 is in communication with the memory 227. The processor 225 is configured to execute instruction code stored in the memory 227. The instruction code facilitates performing, by the server 102, various operations that are described below. In this regard, the instruction code can cause the processor 225 to control and coordinate various activities performed by the different subsystems of the server 102. The processor 225 can correspond to a stand-alone computer system such as an Intel®, AMD®, or PowerPC® based computer system or a different computer system and can include application-specific computer systems. The computer system can include an operating system, such as Linux, Unix®, or a different operating system.

An example of the I/O subsystem 210 includes one or more input/output interfaces configured to facilitate communications with entities outside of the server 102. An example of the I/O subsystem 210 is configured to communicate information via a RESTful API or a Web Service API. An example of I/O subsystem 210 implements a web browser to facilitate generating one or more web-based interfaces through which users of the server 102, the user device(s) 104, and/or other systems interact with the server 102.

An example of the I/O subsystem 210 includes communication circuitry configured to facilitate communicating information to and from the server 102. An example of the communication circuitry facilitates wired and/or wireless communication. For instance, an example of the communication circuitry facilitates communicating information via a wired and/or wireless Internet connection. An example of the communication circuitry facilitates communicating information via a cellular telephone network such as a 3G, 4G, and/or 5G network. Other examples of the communication circuitry facilitate communication of information via an 802.11 based network, Bluetooth®, Zigbee®, near field communication technology, or a different wired or wireless network.

An example of the cardinality estimation logic 215 is configured to receive user-identifying information 110 (e.g., collection of elements) that is received by the server 102 and to estimate the cardinality or number of unique elements in the user-identifying information 110 (e.g., the number of different individuals represented by the information). In an example, the cardinality estimation logic 215 updates the cardinality estimate whenever the user-identifying information 110 specifies an element (e.g., particular individual) that is not already represented within the cardinality estimate. For instance, some examples of the user-identifying information 110 are specified in an information stream that is associated with individuals visiting a web page of the server 102. As individuals visit the web page, user-identifying information 110 associated with these individuals is passed to the cardinality estimation logic 215 to facilitate updating the cardinality estimate. In an example, the cardinality estimate is specified in cardinality information 112 that is output from the cardinality estimation logic 215.

Figure 3:
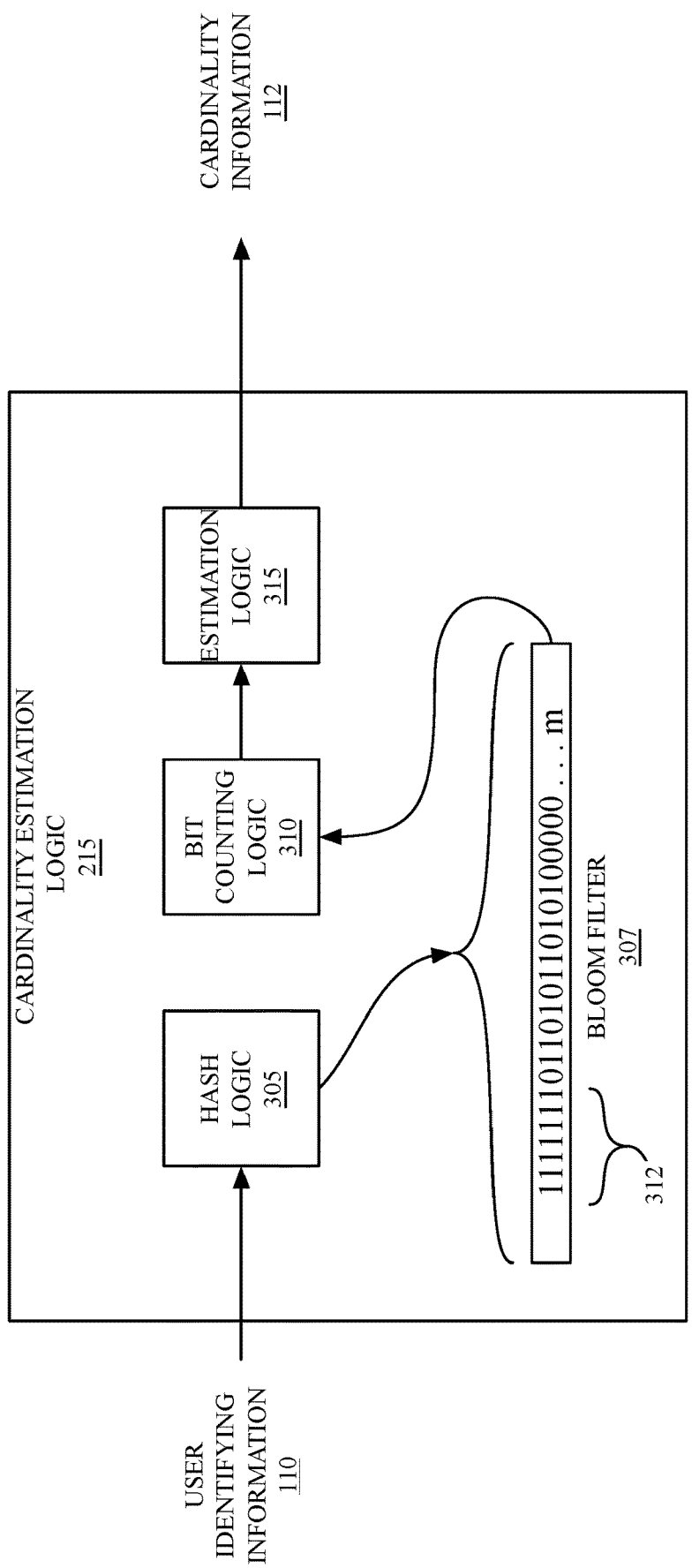
FIG. 3 illustrates cardinality estimation logic, in accordance with example embodiments.

FIG. 3 illustrates an example of the cardinality estimation logic 215. The cardinality estimation logic 215 includes hash logic 305, bit-counting logic 310, and estimation logic 315.

Some examples of the hash logic 305 are configured to generate hash values associated with the elements of the user identifying information 110 (e.g., cookies, email addresses, names, etc., associated with individuals). The hash values specify bit positions (e.g., bit 0, bit 1, ..., $bit_m$) within an array of bits 307. In some examples, hash values output from the hash logic 305 conform to a geometric distribution such that bit positions of the array of bits 307 corresponding to lower orders bits are more likely to be generated than bit positions corresponding to higher-order bits.

In some examples, the bit position $L(x_j)$ associated with a particular element $x_j$, is determined according to the function:

$$L(x_j) = \left\lceil \frac{\log(1 - h(x_j))}{\log(1 - \rho)} \right\rceil$$

where h corresponds to a hash function that hashes each $x_j$ uniformly at random to values in the unit interval and $\rho$ specifies a geometric distribution of the bits across the array of bits.

After the bit position has been determined, a corresponding bit of the array of bits 307 is set. For instance, the name of a particular individual can be hashed to the value five. In this case, bit five of the array of bits 307 is set.

Some examples of the bit-counting logic 310 are configured to count the number of bits of the array of bits 307 that are set (e.g., have the value one). Some examples of the bit-counting logic 310 are configured to iterate over the entire length of the array of bits 307 and increment a counter for each bit that is set to one.

Some examples of the estimation logic 315 are configured to estimate the number of unique elements of the collection of elements (i.e., the cardinality) as a function of the number of bits of the array of bits that are set. Some examples of the cardinality estimation logic 215 estimate the number of unique elements according to the function:

$$\hat{n} = \left( e^\gamma \rho (1 - \rho)^{S - \frac{1}{2}} \right)^{-1},$$

where S corresponds to the number of bits, $\gamma$ is the Euler-Mascheroni constant of 0.577216, $\rho$ specifies the geometric distribution of the bits across the array of bits, and $\hat{n}$ corresponds to an estimate of the number of unique elements of the collection of elements.

Other examples of the cardinality estimation logic 215 estimate the number of unique elements of the collection of elements as an unbiased function of the number of bits of the array of bits. In these examples, the estimation logic is configured to estimate the number of unique elements according to the function:

$$\hat{n} = \left( c e^\gamma \rho (1 - \rho)^{S - \frac{1}{2}} \right)^{-1},$$

where S corresponds to the number of bits, $\gamma$ is the Euler-Mascheroni constant of 0.577216, $\rho$ specifies the geometric distribution of the bits across the array of bits, $\hat{n}$ corresponds to an estimate of the number of unique elements of the collection of elements, and $$c = \left( 1 - \frac{1}{2} \log(2) \log(1 - \rho) \right).$$

In some examples, the array of bits 307 corresponds to a Bloom filter, and the Bloom filter is, thereby, associated with the collection of elements used in determining the bits of the Bloom filter to set. In some examples, the cardinality information 112 specifies the Bloom filter.

In some example operations, cardinality information 112 that includes the Bloom filter is communicated to another system such as the advertisement system 108. A second server (or the same server) can communicate a second Bloom filter that is associated with a second collection of elements to the advertisement system 108. In some instances, elements specified in the first collection of elements are also specified in the second collection of elements. For example, a particular individual may have visited both servers and, therefore, may be represented in both the first Bloom and the second Bloom filter.

In some examples, the advertisement server 108 merges the bits of the first Bloom with the corresponding bits of the second Bloom filter to obtain a merged Bloom filter. For example, a bit-wise OR'ing of the first Bloom filter and the second Bloom filter is performed. OR'ing of the bits prevents double counting a particular element or individual.

After merging, the number of elements between the first collection of elements and the second collection that are unique (i.e., the combined cardinality) is determined as a function of the number of bits of the merged Bloom filter that are set. In some examples, the cardinality is determined via the cardinality estimation logic 215 described above.

In some examples, the server 102 utilizes the techniques described above to estimate the number of individuals that clicked on particular advertisements hosted by the server 102. In some cases, the server 102 can determine a cost-per-click to associate with the particular advertisement as a function of the estimated number of individuals that clicked on the particular advertisements. For example, an operator can increase the cost-per-click associated advertisements that receive clicks from a large number of different individuals and can decrease the cost-per-click associated with those advertisements that do not receive as many clicks from different individuals.

Figure 4:
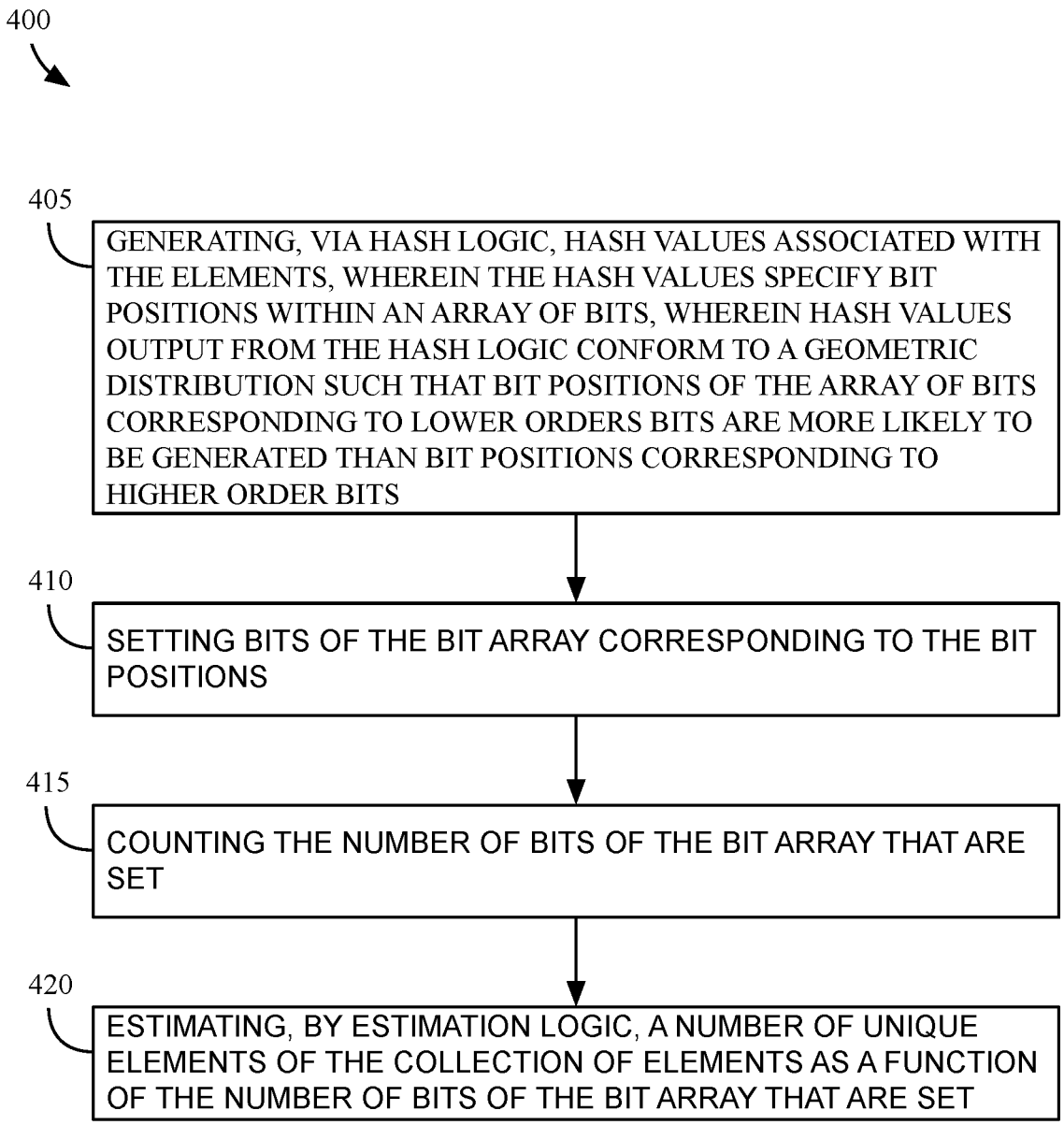
FIG. 4 illustrates a method performed by one or more systems or devices, in accordance with example embodiments.

FIG. 4 illustrates an example of a method 400 that can be performed by one or more systems or devices described herein.

Block 405 involves generating, via hash logic 305, hash values associated with the elements, wherein the hash values specify bit positions within an array of bits 307, wherein hash values output from the hash logic conform to a geometric distribution such that bit positions of the array of bits 307 corresponding to lower orders bits 312 are more likely to be generated than bit positions corresponding to higher-order bits.

Block 410 involves setting bits of the array of bits 307 corresponding to the bit positions.

Block 415 involves counting the number of bits of the array of bits 307 that are set.

Block 420 involves estimating, by estimation logic 315, a number of unique elements of the collection of elements as a function of the number of bits of the array of bits 307 that are set.

In an example, the estimation logic 315 is configured to estimate the number of unique elements according to the function:

$$\hat{n} = \left(e^\gamma \rho (1-\rho)^{S-\frac{1}{2}}\right)^{-1},$$

where S corresponds to the number of bits, γ is the Euler-Mascheroni constant of 0.577216, ρ specifies the geometric distribution of the bits across the array of bits, and $\hat{n}$ corresponds to an estimate of the number of unique elements of the collection of elements.

In an example, estimating the number of unique elements of the collection of elements as a function of the number of bits of the array of bits 307 that are set involves estimating the number of unique elements of the collection of elements as an unbiased function of the number of bits of the array of bits 307. In this case, in an example, the estimation logic is configured to estimate the number of unique elements according to the function:

$$\hat{n} = \left(ce^\gamma \rho (1-\rho)^{S-\frac{1}{2}}\right)^{-1},$$

where S corresponds to the number of bits, γ is the Euler-Mascheroni constant of 0.577216, ρ specifies the geometric distribution of the bits across the array of bits, $\hat{n}$ corresponds to an estimate of the number of unique elements of the collection of elements, and $$c = \left(1 - \frac{1}{2}\log(2)\log(1-\rho)\right).$$

In an example, bit position $L(x_j)$ associated with a particular element $x_j$, is determined according to the function:

$$L(x_j) = \left\lceil \frac{\log(1 - h(x_j))}{\log(1-\rho)} \right\rceil$$

where h corresponds to a hash function that hashes each $x_j$ uniformly at random to values in the unit interval and ρ specifies a geometric distribution of the bits across the array of bits.

In an example, the array of bits 307 corresponds to a Bloom filter that is associated with the collection of elements, An example involves receiving a second Bloom filter that is associated with a second collection of elements. Bits of the first Bloom are merged with corresponding bits of the second Bloom filter to obtain a merged Bloom filter. The estimation logic 315 estimates the number of elements between the first collection of elements and the second collection that are unique as a function of the number of bits of the merged Bloom filter that are set.

In an example, the method is performed by a server 102 and elements of the collection of elements are associated with one or more individuals. This example further involves estimating the number of individuals that visited the server 102.

An example further involves estimating the number of individuals that clicked on particular advertisements hosted by the server 102 and determining a cost-per-click associated with the particular advertisements as a function of the estimated number of individuals that clicked on the particular advertisements.

Figure 5:
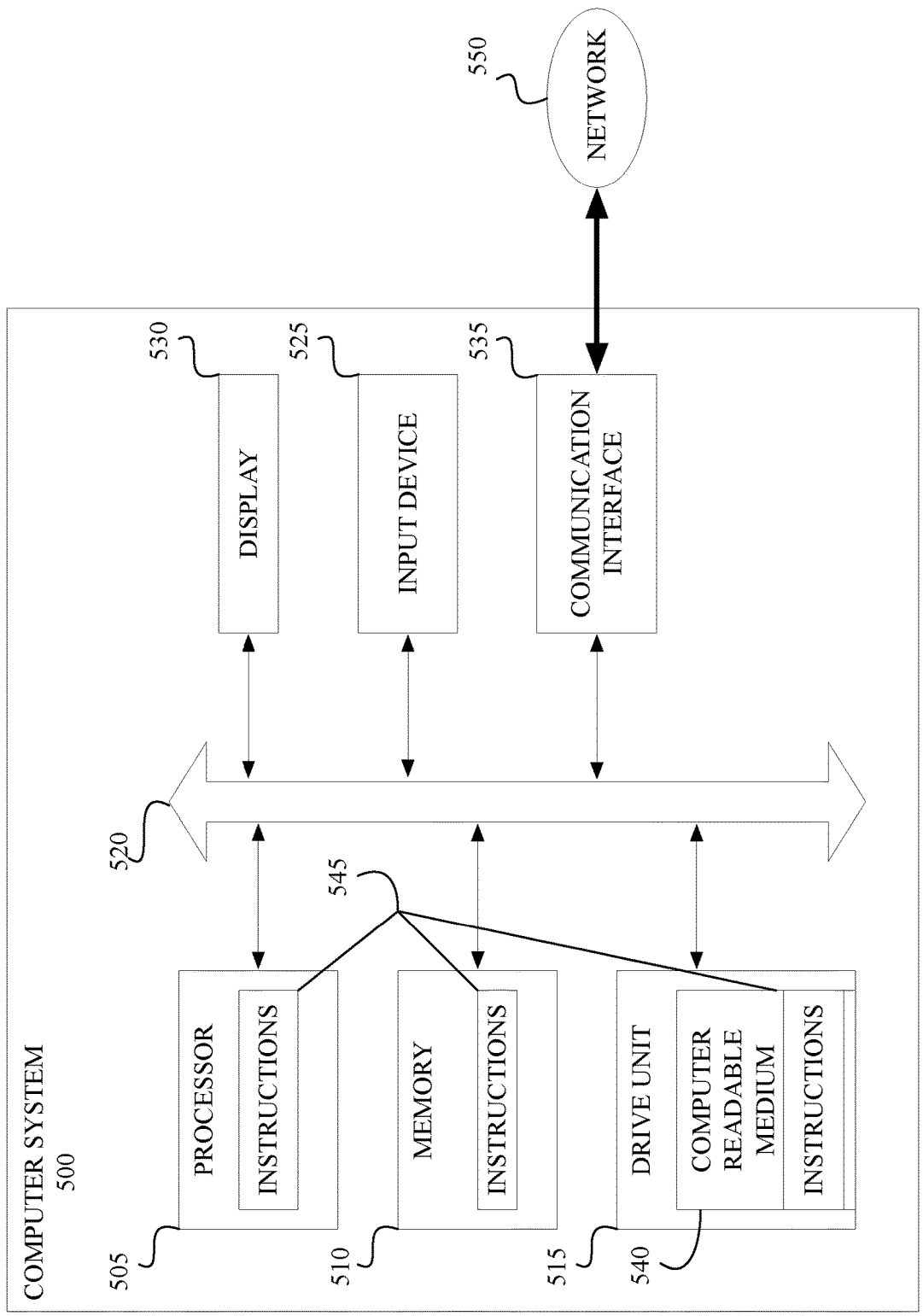
FIG. 5 illustrates a computer system that can form part of or implement any of the systems or devices of the environment, in accordance with example embodiments.

FIG. 5 illustrates an example of a computer system 500 that can form part of or implement any of the systems and/or devices described above. The computer system 500 can include a set of instructions 545 that the processor 505 can execute to cause the computer system 500 to perform any of the operations described above. An example of the computer system 500 can operate as a stand-alone device or can be connected, e.g., using a network, to other computer systems or peripheral devices.

In a networked example, the computer system 500 can operate in the capacity of a server or as a client computer in a server-client network environment, or as a peer computer system in a peer-to-peer (or distributed) environment. The computer system 500 can also be implemented as or incorporated into various devices, such as a personal computer or a mobile device, capable of executing instructions 545 (sequential or otherwise), causing a device to perform one or more actions. Further, each of the systems described can include a collection of subsystems that individually or jointly execute a set, or multiple sets, of instructions to perform one or more computer operations.

The computer system 500 can include one or more memory devices 510 communicatively coupled to a bus 520 for communicating information. In addition, code operable to cause the computer system to perform operations described above can be stored in the memory 510. The memory 510 can be random-access memory, read-only memory, programmable memory, hard disk drive, or any other type of memory or storage device.

The computer system 500 can include a display 530, such as a liquid crystal display (LCD), a cathode ray tube (CRT), or any other display suitable for conveying information. The display 530 can act as an interface for the user to see processing results produced by processor 505.

Additionally, the computer system 500 can include an input device 525, such as a keyboard or mouse or touchscreen, configured to allow a user to interact with components of system 500.

The computer system 500 can also include a disk or optical drive unit 515. The drive unit 515 can include a computer-readable medium 540 in which the instructions 545 can be stored. The instructions 545 can reside completely, or at least partially, within the memory 510 and/or within the processor 505 during execution by the computer system 500. The memory 510 and the processor 505 also can include computer-readable media, as discussed above.

The computer system 500 can include a communication interface 535 to support communications via a network 550. The network 550 can include wired networks, wireless networks, or combinations thereof. The communication interface 535 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A computer-implemented method for efficiently estimating a number of unique elements in a collection of elements, the method comprising:
generating, via hash logic, hash values associated with the collection of elements, wherein the hash values specify bit positions within an array of bits, wherein hash values output from the hash logic conform to a geometric distribution of bits such that bit positions of the array of bits corresponding to lower orders bits are more likely to be generated than bit positions corresponding to higher-order bits;
setting bits of the array of bits corresponding to the bit positions;
counting a number of bits of the array of bits that are set;
estimating, by estimation logic, a number of unique elements of the collection of elements as a function of the number of bits of the array of bits that are set,
wherein bit position $L(x_j)$ associated with a particular element $x_j$, is determined according to the function:

$$L(x_j) = \left\lceil \frac{\log(1 - h(x_j))}{\log(1 - \rho)} \right\rceil$$

where h corresponds to a hash function that hashes each $x_j$ uniformly at random to values in the unit interval and $\rho$ specifies a geometric distribution of the bits across the array of bits.

2. The computer-implemented method according to claim 1, wherein the estimation logic is configured to estimate the number of unique elements according to the function:

$$\hat{n} = \left(e^{\gamma}\rho(1-\rho)^{S-\frac{1}{2}}\right)^{-1},$$

where S corresponds to the number of bits, $\gamma$ is a Euler-Mascheroni constant of 0.577216, $\rho$ specifies the geometric distribution of bits across the array of bits, and $\hat{n}$ corresponds to an estimate of the number of unique elements of the collection of elements.

3. The computer-implemented method according to claim 1, wherein estimating the number of unique elements of the collection of elements as a function of the number of bits of the array of bits that are set comprises estimating the number of unique elements of the collection of elements as an unbiased function of the number of bits of the array of bits, wherein the estimation logic is configured to estimate the number of unique elements according to the function:

$$\hat{n} = \left(ce^{\gamma}\rho(1-\rho)^{S-\frac{1}{2}}\right)^{-1},$$

where S corresponds to the number of bits, $\gamma$ is a Euler-Mascheroni constant of 0.577216, $\rho$ specifies the geometric distribution of bits across the array of bits, $\hat{n}$ corresponds to an estimate of the number of unique elements of the collection of elements, and $$c = \left(1 - \frac{1}{2}\log(2)\log(1-\rho)\right).$$

4. The computer-implemented method according to claim 1, wherein the array of bits corresponds to a Bloom filter that is associated with the collection of elements.

5. The computer-implemented method according to claim 4, further comprising:
receiving a second Bloom filter that is associated with a second collection of elements;
merging bits of the first Bloom with corresponding bits of the second Bloom filter to obtain a merged Bloom filter; and
estimating, by the estimation logic, a number of elements between the first collection of elements and the second collection that are unique as a function of the number of bits of the merged Bloom filter that are set.

6. The computer-implemented method according to claim 1, wherein the method is performed by a server, wherein elements of the collection of elements are associated with one or more individuals, wherein the computer-implemented method facilitates estimating a number of individuals that visited the server.

7. The computer-implemented method according to claim 6, further comprising estimating a number of individuals that clicked on particular advertisements hosted by the server, and determining a cost-per-click associated with the particular advertisement as a function of the estimated number of individuals that clicked on the particular advertisements.

8. A computing system:
one or more processors; and
a memory in communication with the one or more processors, wherein the memory stores instruction code that, when executed by the one or more processors, causes the computing system to perform operations comprising:
generating, via hash logic, hash values associated with a collection of elements, wherein the hash values specify bit positions within an array of bits, wherein hash values output from the hash logic conform to a geometric distribution of bits such that bit positions of the array of bits corresponding to lower orders bits are more likely to be generated than bit positions corresponding to higher-order bits;
setting bits of the array of bits corresponding to the bit positions;
counting a number of bits of the array of bits that are set;
estimating, by estimation logic, a number of unique elements of the collection of elements as a function of the number of bits of the array of bits that are set, wherein bit position L(x$_j$) associated with a particular element x$_j$, is determined according to the function:

$$L(x_j) = \left\lceil \frac{\log(1 - h(x_j))}{\log(1 - \rho)} \right\rceil$$

where h corresponds to a hash function that hashes each x$_j$ uniformly at random to values in the unit interval and ρ specifies a geometric distribution of the bits across the array of bits.

9. The computing system according to claim 8, wherein the estimation logic is configured to estimate the number of unique elements according to the function:

$$\hat{n} = \left(e^\gamma \rho(1 - \rho)^{S-\frac{1}{2}}\right)^{-1},$$

where S corresponds to the number of bits, γ is a Euler-Mascheroni constant of 0.577216, ρ specifies the geometric distribution of bits across the array of bits, and n̂ corresponds to an estimate of the number of unique elements of the collection of elements.

10. The computing system according to claim 8, wherein estimating the number of unique elements of the collection of elements as a function of the number of bits of the array of bits that are set comprises estimating the number of unique elements of the collection of elements as an unbiased function of the number of bits of the array of bits, wherein the estimation logic is configured to estimate the number of unique elements according to the function:

$$\hat{n} = \left(ce^\gamma \rho(1 - \rho)^{S-\frac{1}{2}}\right)^{-1},$$

where S corresponds to the number of bits, γ is a Euler-Mascheroni constant of 0.577216, ρ specifies the geometric distribution of bits across the array of bits, n̂ corresponds to an estimate of the number of unique elements of the collection of elements, and $$c = \left(1 - \frac{1}{2}\log(2)\log(1 - \rho)\right).$$

11. The computing system according to claim 8, wherein the array of bits corresponds to a Bloom filter that is associated with the collection of elements.

12. The computing system according to claim 11, wherein the operations further comprise:
receiving a second Bloom filter that is associated with a second collection of elements;
merging bits of the first Bloom with corresponding bits of the second Bloom filter to obtain a merged Bloom filter; and
estimating, by the estimation logic, a number of elements between the first collection of elements and the second collection that are unique as a function of the number of bits of the merged Bloom filter that are set.

13. The computing system according to claim 8, wherein the computing system corresponds to a web server, wherein elements of the collection of elements are associated with one or more individuals, wherein the operations facilitate estimating a number of individuals that visited the web server.

14. The computing system according to claim 13, wherein the operations further comprise estimating a number of individuals that clicked on particular advertisements hosted by the web server, and determining a cost-per-click associated with the particular advertisement as a function of the estimated number of individuals that clicked on the particular advertisements.

15. A non-transitory computer-readable medium having stored thereon instruction code that, when executed by one or more processors of a computing system, causes the computing system to perform operations comprising:
generating, via hash logic, hash values associated with a collection of elements, wherein the hash values specify bit positions within an array of bits, wherein hash values output from the hash logic conform to a geometric distribution of bits such that bit positions of the array of bits corresponding to lower orders bits are more likely to be generated than bit positions corresponding to higher-order bits;
setting bits of the array of bits corresponding to the bit positions;
counting a number of bits of the array of bits that are set;
estimating, by estimation logic, a number of unique elements of the collection of elements as a function of the number of bits of the array of bits that are set,
wherein bit position L(x$_j$) associated with a particular element x$_j$, is determined according to the function:

$$L(x_j) = \left\lceil \frac{\log(1 - h(x_j))}{\log(1 - \rho)} \right\rceil$$

where h corresponds to a hash function that hashes each x$_j$ uniformly at random to values in the unit interval and ρ specifies a geometric distribution of the bits across the array of bits.

16. The non-transitory computer-readable medium according to claim 15, wherein the estimation logic is configured to estimate the number of unique elements according to the function:

$$\hat{n} = \left(e^\gamma \rho(1 - \rho)^{S-\frac{1}{2}}\right)^{-1},$$

where S corresponds to the number of bits, γ is a Euler-Mascheroni constant of 0.577216, ρ specifies the geometric distribution of bits across the array of bits, and n̂ corresponds to an estimate of the number of unique elements of the collection of elements.

17. The non-transitory computer-readable medium according to claim 15, wherein estimating the number of unique elements of the collection of elements as a function of the number of bits of the array of bits that are set comprises estimating the number of unique elements of the collection of elements as an unbiased function of the number of bits of the array of bits, wherein the estimation logic is configured to estimate the number of unique elements according to the function:

$$\hat{n} = \left(ce^\gamma \rho(1 - \rho)^{S-\frac{1}{2}}\right)^{-1},$$

where S corresponds to the number of bits, γ is a Euler-Mascheroni constant of 0.577216, ρ specifies the geometric distribution of bits across the array of bits, n̂ corresponds to an estimate of the number of unique elements of the collection of elements, and $$c = \left(1 - \frac{1}{2}\log(2)\log(1-\rho)\right).$$

* * * * *